US012288452B1

(12) United States Patent
Peters et al.

(10) Patent No.: US 12,288,452 B1
(45) Date of Patent: Apr. 29, 2025

(54) PORTABLE ALARM

(71) Applicant: Birdie Love Inc., Berkeley, CA (US)

(72) Inventors: Alison Peters, Los Angeles, CA (US); Amy Ferber, Berkeley, CA (US)

(73) Assignee: Birdie Love Inc., Berkeley, CA (US)

( * ) Notice: Subject to any disclaimer, the term of this patent is extended or adjusted under 35 U.S.C. 154(b) by 0 days.

(21) Appl. No.: 18/919,347

(22) Filed: Oct. 17, 2024

(51) Int. Cl.
*G08B 13/08* (2006.01)
*G08B 5/38* (2006.01)
*G08B 13/16* (2006.01)
*G08B 13/184* (2006.01)
*G08B 25/00* (2006.01)

(52) U.S. Cl.
CPC ............... *G08B 13/08* (2013.01); *G08B 5/38* (2013.01); *G08B 13/1618* (2013.01); *G08B 13/184* (2013.01); *G08B 25/008* (2013.01)

(58) Field of Classification Search
CPC ...... G08B 13/08; G08B 5/38; G08B 13/1618; G08B 13/184; G08B 25/008
See application file for complete search history.

(56) References Cited

U.S. PATENT DOCUMENTS 5,936,522 A * 8/1999 Vogt ....................... G08B 13/08 340/556
7,456,738 B2 * 11/2008 Yoong .................... G06Q 10/08 116/12
7,466,890 B2 * 12/2008 Kachmar ............... G08B 13/08 385/16
7,714,718 B2 * 5/2010 DiPoala ................. G08B 13/08 340/545.1
7,834,309 B2 * 11/2010 Anderson .............. G08B 13/08 250/221
8,400,301 B1 3/2013 Kersch
8,982,360 B2 * 3/2015 Zhao .................... G08B 13/186 356/614
9,589,446 B1 * 3/2017 Dey ..................... G08B 25/008
10,087,679 B2 * 10/2018 Gitman ...................... E06B 7/28
10,497,230 B2 12/2019 Lamb
10,706,703 B1 * 7/2020 Barr ....................... G08B 13/08
11,170,617 B2 * 11/2021 Westman ............... G08B 13/22
11,293,782 B2 * 4/2022 Amir ...................... G08B 13/08
11,295,584 B2 * 4/2022 Carlson .............. G06K 7/10425
11,619,738 B2 * 4/2023 Litvak .................... G08B 29/18 356/498

(Continued)

*Primary Examiner* — Nay Tun
(74) *Attorney, Agent, or Firm* — Esplin & Associates, PC

(57) ABSTRACT

Systems and methods to provide a portable alarm are disclosed herein. The portable alarm may be configured to detect relative movement between a closure of an aperture and a wall forming the aperture. The portable alarm may include a detector body and a detection body. The detector body may include a detector body mount, a first sensor, a transducer, a light source, and control electronics. The detection body may include a detection body mount and a second sensor. The control electronics may be configured to control the transducer and/or the light source to generate a first feedback indicating close proximity between the first sensor and the second sensor and to control the transducer and/or the light source to generate a second feedback different from the first feedback, subsequent to provision of the first feedback, responsive to a reduction in proximity between the first sensor and the second sensor.

20 Claims, 6 Drawing Sheets

(56) References Cited

U.S. PATENT DOCUMENTS

| | | | | |
|---|---|---|---|---|
| 11,763,652 | B2 * | 9/2023 | Carlson | G08B 13/24<br>340/551 |
| 2002/0196155 | A1 | 12/2002 | McNulty | |
| 2007/0075859 | A1 | 4/2007 | Garavuso | |
| 2012/0112910 | A1 * | 5/2012 | Meyers | G08B 13/08<br>340/547 |
| 2016/0140817 | A1 * | 5/2016 | Beagley | G08B 13/1645<br>340/555 |
| 2016/0247370 | A1 * | 8/2016 | Lamb | G08B 25/008 |
| 2017/0356238 | A1 * | 12/2017 | Gitman | G01D 5/241 |

* cited by examiner

PORTABLE ALARM

FIELD OF THE DISCLOSURE

The present disclosure is related to alarms and alarm systems that monitor barriers, boundaries, and/or apertures.

BACKGROUND

Security systems are often used to monitor homes, offices, and other spaces. These security systems may use cameras, alarms, sensors, and/or other devices to detect and alert users of threats or intruders. Many commercially available security systems include a plurality of interacting devices. For example, alarms may be installed within a home and communicate with cameras and sensors positioned in remote locations around the home. These systems are often permanently installed and require a networked connection to facilitate communication between the devices. As such, these systems are not easily portable or adaptable to different locations or situations.

SUMMARY

To solve the problems associated with currently available alarms, the present disclosure describes a portable alarm that can be easily transported and installed in different locations (e.g., hotels, vacation rentals, office spaces, vehicles, etc.). Additionally, the alarm may operate without a networked connection to a central security device, allowing the alarm to function in remote locations where access to Internet is limited or unavailable. The portable alarm system monitors barriers, boundaries, and/or apertures. The portable alarm system may include two separate components that can be removably mounted to and detached from entryways, windows, or other barriers, thereby making the alarm system portable and deployable at selectively at different locations. For example, a first component of the alarm may be mounted to a door and a second component may be mounted to the doorframe at a position near the first component. The portable alarm may be armed and/or engaged when the components are mounted, and the door is closed. Subsequently, the portable alarm may be triggered when the door is opened, and the components are separated. While a door is described herein, other application are envisioned. The portable alarm may be installed to a sliding door, a window, vents, hatches, exterior and interior gates (e.g., child safety gates), pet doors and flaps, fences, and/or other types of apertures and closures.

One aspect of the present disclosure relates to a portable alarm configured to detect relative movement between a closure of an aperture and a wall forming the aperture. The aperture and the wall may form a monitored boundary such that relative movement between the closure of the aperture and the wall at the monitored boundary operate to facilitate opening and closing of the aperture. The portable alarm may comprise one or more of a detection body, a detector body, and/or other components. The detection body may include a detection body mount configured to releasably mount the detection body to either the closure or the wall.

The detector body may have a front side and a back side opposite the front side. The detector body may include one or more of a detector body mount, a first sensor, a transducer, a light source, control electronics, and/or other components. The detector mount may be positioned at the back side of the detector body and configured to releasably mount the back side of the detector body to either the closure or the wall. The first sensor may be carried by the detect body and/or may be configured to generate a sensor signal. The sensor signal may indicate relative movement between the detector body and the detection body. The transducer may be configured to controllably generate sound. The light source may be configured to controllably emit light.

The control electronics may be coupled with the first sensor and/or other sensors. The control electronics may be configured to control the transducer and/or the light source to generate a first feedback. The first feedback may indicate close proximity between the first sensor and a second sensor carried by the detection body. The control electronics may control the transducer and/or the light source to generate a second feedback different from the first feedback, subsequent to provision of the first feedback, responsive to a reduction in proximity between the first sensor and the second sensor. By way of non-limiting illustration, responsive to the detector body and the detection body being mounted in proximity to each other on opposite sides of the monitored boundary, generation of the second feedback may be indicative of relative movement of the closure to open the aperture.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1A:
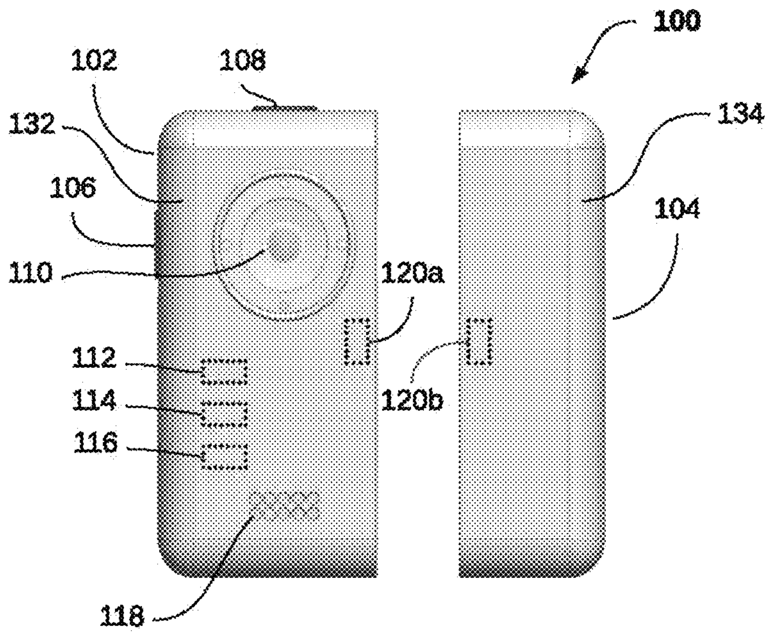
FIG. 1A illustrates a first front view of a portable alarm, in accordance with one or more implementations.
Figure 1B:
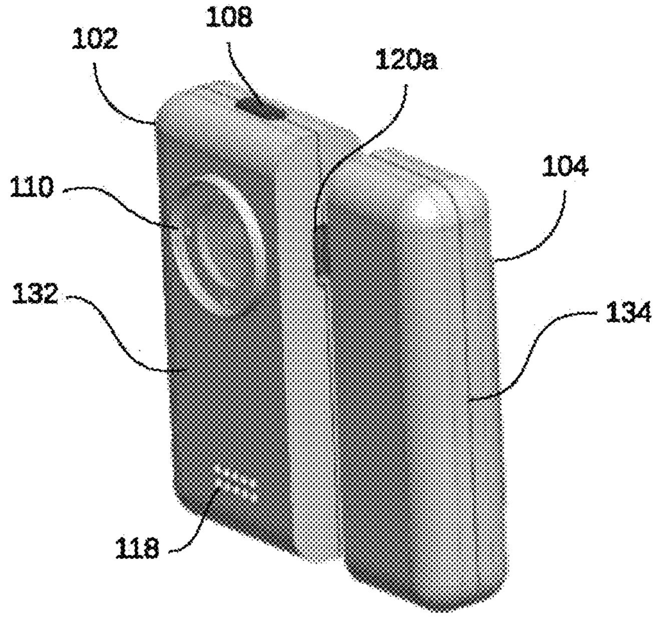
FIG. 1B illustrates a second front view of the portable alarm, in accordance with one or more implementations.

FIG. 1A illustrates a front view of portable alarm 100, in accordance with one or more implementations. Portable alarm 100 may be configured to detect relative movement between a closure of an aperture and a wall forming the aperture. The aperture may be a doorway, a window opening, vent openings, and/or other types of openings and/o gaps formed within a wall. The closure may be a door, window, grate, screen, and/or other apparatuses configured to cover and/or close the aperture. The aperture and the closure of the aperture may form a boundary such that relative movement between the closure of the aperture and the wall at the boundary operate to facilitate opening and closing of the aperture. Portable alarm 100 may be installed and/or releasably mounted at or near the boundary formed between the aperture and the closure of the aperture to monitor the boundary. Referring to FIGS. 1A-B, portable alarm 100 may comprise one or more of a detector body 102, a detection body 104, and/or components. In some implementations, the detector body 102, a detection body 104, and/or components may be configured of one or more of type of plastic, silicon, metal, and/or other materials.

Referring to FIGS. 1A-B, detector body 102 may form a housing 132 configured to carry one or more components. The one or more components may include one or more of a transducer 112, a light source 114, control electronics 116 (depicted in FIG. 1 as dotted rectangles to indicate the component may be carried and/or embedded in detector body 102, and not readily visible from the outside), and/or other components. In some implementations, transducer 112, light source 114, and/or control electronics 116 may be included in detector body 102, e.g., within detector body 102. For example, one or more of transducer 112, light source 114, control electronics 116, and/or other component may be integrated permanently into detector body 102 such that detector body 102 forms an integral whole. In some implementations, detector body 102 may have a height of 2 inches, 3 inches, 4 inches, and/or other height. Detector body 102 may have a width of 0.5 inches, 1 inch, 1.5 inches, 2 inches, and/or other width. Detector body 102 have a depth (shown in FIGS. 3A-B and 4A-B) of 5 millimeters, 7 millimeters, 10 millimeters, and/or other depth.

Transducer 112 may be configured to generate sound. The sound generated by transducer 112 may be unpleasant, loud, high pitched, repetitive, and/or other characteristics to deter a threat, draw attention, and/or alert a user. In some implementations, the sound generated by transducer 112 may be greater than about 120 decibels, 130 decibels, 140 decibels; may be less than about 120 decibels, 130 decibels, 140 decibels; and/or may be within a range bounded at the upper end by any loudness of sound in the former listing of loudness of sound and bounded at the lower end by any loudness of sound in the latter listing of loudness of sound.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±2 decibels of the given numeric value provided such a deviation does not alter the end function or result of the value. Therefore, a value of about 130 decibels can be construed to be a range from 128 decibels to 132 decibels. Furthermore, a range may be construed to include the start and the end of the range. For example, a range of 120 decibels to 140 decibels (i.e., range of 120-140 decibels) includes 120 decibels and also includes 140 decibels, as well as decibels in between 120 decibels and 140 decibels, unless explicitly stated otherwise herein.

Detector body 102 and/or housing 132 formed by detector body 102 may be formed with one or more sound openings 118. In some implementations, sound openings 118 may be formed on the front side of detector body 102 (as shown in FIGS. 1A-B) and/or other sides of detector body 102. Sound openings 112 may facilitate delivery of sound generated by transducer 112. In some implementations, detector body 102 and/or housing 132 formed by detector body 102 may be formed with a single opening 118, such as a circle hole or a square hole. In some implementations, Detector body 102 and/or housing 132 formed by detector body 102 may be formed with multiple openings 118 such as multiple circle holes in a line or multiple square holes in two lines.

Light source 114 may be configured to emit light. Light source 114 may be one or more light-emitting diodes (LED), one or more compact fluorescent lamps (CFL), one or more halogen lamps, one or more incandescent lamps, and/or other bright light. Detector body 102 may include light opening 110 configured to facilitate the escape of light emitted by light source 114. Light opening 110 is shown as a large, singular opening, however this is not intended to be limiting. Light opening 110 may be comprised of a plurality of small openings arranged in a circle, multiple lines, and/or other arrangements.

In some implementations, light source 114 may emit light in accordance with one or more light settings. Individual light settings may be defined by different light features. Light features may include light color, presentation pattern, brightness, and/or other features. Light color may be one or more of a blue light, a red light, a white light, and/or other colored lights. Presentation pattern may be one of more of continuous light presentation, flashing light presentation, a perimeter movement presentation, and/or other presentations. The continuous light presentation may emit light in the one or more colors at a particular brightness until termination and/or deactivation of light source 114. The flashing light presentation may flash or strobe light in the one or more colors at a particular brightness until termination and/or deactivation of light source 114. The perimeter movement presentation may, in a revolution, emit light in the one or more colors at a particular brightness until termination and/or deactivation of light source 114. Light source 114 may be terminated and/or deactivated in response to the user producing a termination selection combination of button 108. By way of non-limiting illustration, light source 114 may configured emit light in a first light setting, a second light setting, and/or other light settings. Light source 114 may emit a dim, continuous blue light when in the first light setting. Light source 114 may emit a bright, flashing red light when in the second light setting. In some implementations, the light setting of light source 114 may be controlled by control electronics 116 and/or other components.

In some implementations, the brightness of light emitted by light source 114 may be fixed and unmodifiable. In some implementations, the brightness may be modifiable via particular selection combination of button 108. The brightness may be a particular amount of lumens. By way of non-limiting example, the amount of lumens may be about 300 lumens, 400 lumens, 500 lumens, or other amount of lumens. Increasing the brightness may increase the amount of lumens, and decreasing the brightness may decrease the amount of lumens.

Figure 3A:
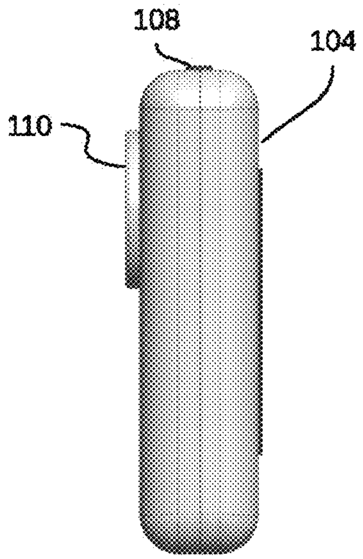
FIG. 3A illustrates a first side of the portable alarm, in accordance with one or more implementations.
Figure 3B:
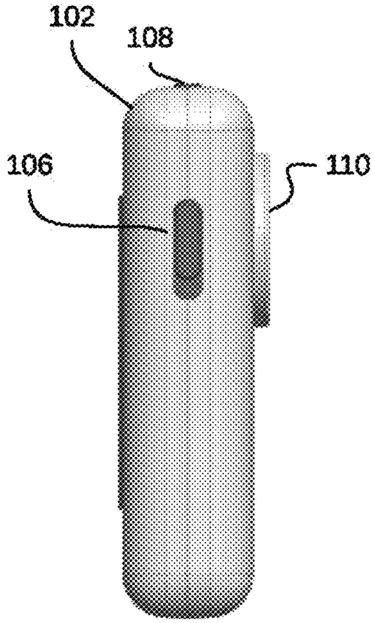
FIG. 3B illustrates a second side of the portable alarm, in accordance with one or more implementations.
Figure 4A:
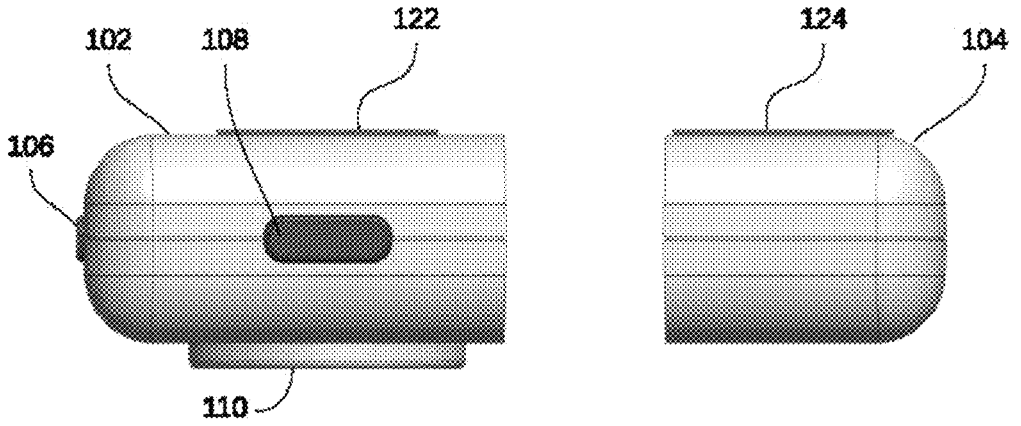
FIG. 4A illustrates a top-down view of the portable alarm, in accordance with one or more implementations.
Figure 4B:
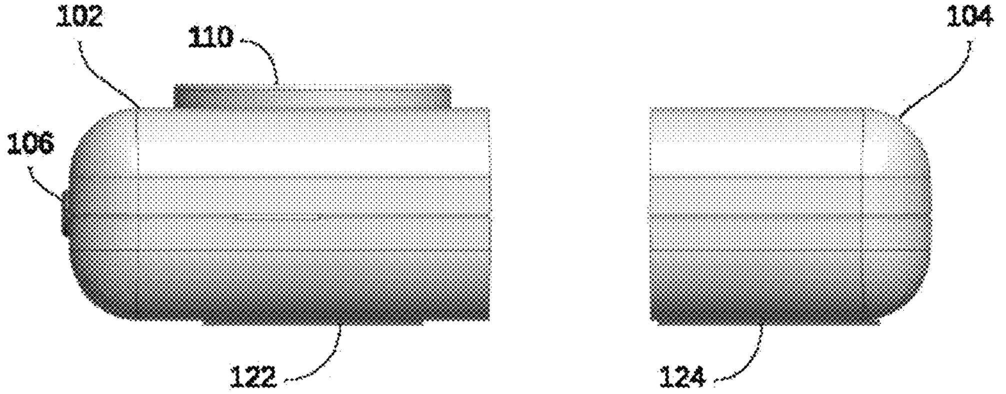
FIG. 4B illustrates a bottom-up view of the portable alarm, in accordance with one or more implementations

Detector body 102 may include a power switch 106 and/or other components. Power switch 106 may be a button or a switch that is toggles from one side to another. Power switch 106 may be connected to one or more of transducer 112, light source 114, control electronics 116, and/or other components. Power switch 106 may enable and disable possible activation of transducer 112, light source 114, and/or control electronics 116 upon selection or toggle. In some implementations, power switch 106 may be disposed on an edge of detector body 102 as illustrated in FIG. 3B.

Power switch 106 may enable function of transducer 112 and/or light source 114 upon control by control electronics 116, as described herein. In some implementations, upon effectuation of transducer 112 and/or light source 114, a change of power switch 106 from the on-position to the off-position may immediately deactivate transducer 112 and/or light source 114.

In some implementations, detector body 102 may include one or more power sources to provide power to one or more of transducer 112, light source 114, control electronics 116, and/or other components. The power sources may include one or more disposable batteries, rechargeable batteries, and/or other power sources. In some implementations, detector body 102 may include one or more charging ports (e.g., USB, USB mini, USB Type C, etc.) to facilitate recharging of the rechargeable batteries. In some implementations, detector body 102 (and/or detection body 104) may include a location tracking device. The location tracking device may be configured to determine a location of portable alarm 100 and/or transmit the location of portable alarm 100 to one or more remotely located devices (e.g., mobile phone). In some implementations, the location tracking device may be configured to transmit the location of portable alarm 100 in a continuous manner. In some implementations, the location tracking device may be configured to transmit the location of portable alarm 100 responsive to an occurrence of event. By way of non-limiting illustration, the event may include triggering of portable alarm 100 subsequent to arming of portable alarm 100 and/or other events. The location tracking device may be a global positioning system (GPS), Bluetooth tracker, Wi-Fi tracker, and/or other types of location tracking devices.

Detection body 104 may form a housing 134 configured to carry one or more components. The one or more components may include second sensor 120*b*, and/or other components. In some implementations, second sensor 120*b* may be included in detector body 102, e.g., within detection body 104. For example, second sensor 120*b*, and/or other components may be integrated permanently into detection body 104 such that detection body 104 forms an integral whole. In some implementations, detection body 104 may have a height of 2 inches, 3 inches, 4 inches, and/or other height. Detection body 104 may have a width of 0.5 inches, 1 inch, 1.5 inches, 2 inches, and/or other width. Detection body 104 have a depth (shown in FIGS. 3A-B and 4A-B) of 5 millimeters, 7 millimeters, 10 millimeters, and/or other depth.

Figure 2:
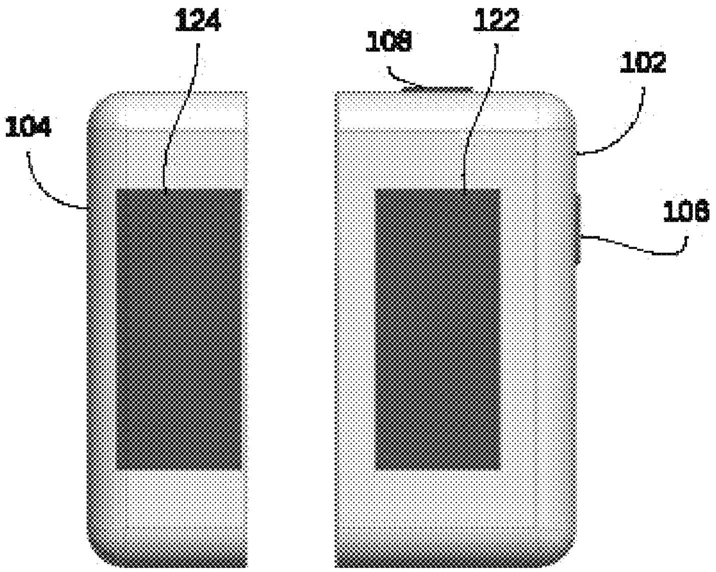
FIG. 2 illustrates a back view of the portable alarm, in accordance with one or more implementations.

Referring to FIG. 2, detector body 102 may include detector body mount 122 configured to releasably mount detector body 102 to either the closure or the wall. Detection body 104 may include detection body mount 124 configured to releasably mount detection body 104 to either the closure or the wall. In some implementations, detector body 102 and/or detection body 104 may be mounted to the closure at or near the monitored boundary. In some implementations, mounting detector body 102 to the closure and/or wall may include attaching and/or otherwise coupling detector body mount 122 to a mounting component affixed to the closure and/or wall. In some implementations, mounting detection body 104 to the closure and/or wall may include attaching and/or otherwise coupling detection body mount 124 to the mounting component affixed to the closure and/or wall. The mounting component affixed to the closure and/or wall may be an adhesive strip (e.g., an adhesive hook and loop strip, adhesive magnet strip, etc.) configured to be removably affixed to the closure and/or wall. Detector body mount 122 and/or detection body mount 124 may also be an adhesive strip (e.g., an adhesive hook and loop strip, adhesive magnet strip, etc.) affixed to a backside of detector body 102 or detection body 104. By way of non-limiting illustration, the adhesive strip may include an adhesive surface and a hook and loop surface opposite the adhesive surface. The adhesive strip may be affixed to the backside of detector body 102 via the adhesive surface of the adhesive strip. The hook and loop surface of the adhesive strip may be configured to couple with another hook and loop surface of the adhesive strip affixed to the closure and/or wall to mount detector body 102 to the closure and/or wall. The adhesive strip may be affixed to the closure and/or wall via by the adhesive surface of the adhesive strip such that the hook and loop surface of the adhesive strip is exposed and configured to couple with the hook and loop surface adhered to the backside of detector body 102. In some implementations detector body mount 122 and detection body mount 124 may mount detector body 102 and detection body 104 directly to the closure and/or wall. By way of non-limiting illustration, detector body mount 122 and detection body mount 124 may be one or more suction cups, adhesive strips, gel pads, and/or other removable attachment mechanisms.

Referring back to FIG. 1A-B, detector body 102 may include a first sensor 120*a* (depicted in FIG. 1A as dotted rectangles to indicate the component may be carried and/or embedded in detector body 102, and not readily visible from the outside) and/or other components. Detection body 104 may include a second sensor 120*b* (depicted in FIG. 1A as dotted rectangles to indicate the component may be carried and/or embedded in detection body 104, and not readily visible from the outside) and/or other components. In some implementations, first sensor 120*a* may be configured to generate a sensor signal. The sensor signal generated by first sensor 120*a* may be one or more a magnetic signal (e.g., a magnetic field), an electromagnetic signal, an electrical signal, an ultrasonic sound signal, a light signal, and/or other types of signals. In some implementations, second sensor 120*b* may be configured to detect the sensor signal generated by first sensor 120*a* and/or generate a response signal, responsive to detection of the sensor signal generated by first sensor 120*a*. First sensor 120*a* may be configured to detect the response signal generated by second sensor 120*b*.

In some implementations, second sensor 120*b* may be a reflective sensor configured to reflect the sensor signal generated by first sensor 120*a*. First sensor 120*a* may be configured to detect the reflected sensor signal. By way of non-limiting illustration, first sensor 120*a* may be configured to generate a light beam. Second sensor 120*b* may be a reflective mirror (and/or other type of reflective sensor) configured to reflect the light beam generated by first sensor 120*a*. First sensor 120*a* may be configured to detect the reflected light beam. Detection, by first sensor 120*a*, of the reflected light beam may indicate proximity between first sensor 120*a* and 120*b*. First sensor 120*a* may be configured to detect, responsive to a reduction and/or absence of the reflected light beam, a reduction in proximity between first sensor 120*a* and second sensor 120*b*.

In some implementations, first sensor 120*a* may include a first magnet and/or second sensor 120*b* may include a second magnet. The first magnet being in proximity to the second magnet may generate a magnet field. First sensor 120*a* may be configured to detect the magnetic field generated by proximity between the first magnet and the second magnet. Detection, by the first sensor 120*a*, of the magnet field may indicate proximity between first sensor 120*a* and 120*b*. First sensor 120*a* may be configured to detect, responsive to a reduction and/or absence of the magnetic field, a reduction in proximity between first sensor 120*a* and second sensor 120*b*.

In some implementations, control electronics 116 may be coupled with first sensor 120*a* and/or other components. Control electronics 116 may be configured to control transducer 112 and/or the light source 114 to generate a first feedback. The first feedback may indicate close proximity between first sensor 120*a* and second sensor 120*b*. The close proximity between first sensor 120*a* and second sensor 120*b* may be due to detector body 102 being releasably mounted to a closure or wall at or near the boundary and detection body 104 being releasably mounted opposite detector body 102 at or near the body to the closure or wall. By way of non-limiting illustration, detector body 102 may be releasably mounted to the wall at or near the boundary and detection body 104 may be releasably mount to the closure at or near the boundary and detection body 102. The close proximity between first sensor 120*a* and second sensor 120*b* may be 0.1 mm, 0.5 mm, 0.25 in, 1 in, and/or other distances. The first feedback may indicate to the user that portable alarm 100 is engaged and configured to monitor the boundary between the closure and the wall forming the aperture. In other words, the first feedback may indicate to the user that portable alarm 100 may be an "armed" mode and capable of detecting relative movement between the closure and the wall to open the aperture. In some implementations, the first feedback may include transducer 112 generating a first sound and/or light source 114 emitting light in a first light setting. The first sound may be a beep sound and/or other sounds having a duration between 50 milliseconds and 1 second. Light source 114 may emit a dim, continuous blue light when in the first light setting.

Control electronics 116 may control transducer 112 and/or light source 114 to generate a second feedback different from the first feedback, subsequent to provision of the first feedback, responsive to a reduction in proximity between first sensor 120*a* and second sensor 120*b*. In some implementations, first sensor 120*a* may detect a reduction and/or absence of a reflected sensor signal reflected by second sensor 120*b* indicating the reduction in proximity between first sensor 120*a* and second sensor 120*b*. In some implementations, first sensor 120*a* may detect a reduction and/or absence of a response sensor signal generated by second sensor 120*b* indicating the reduction in proximity between first sensor 120*a* and second sensor 120*b*. Responsive to detector body 102 and detection body 104 being mounted in proximity to each other on opposite sides of the monitored boundary, generation of the second feedback may be indicative of relative movement of the closure to open the aperture (e.g., by an intruder). In some implementations, the second feedback may include transducer 112 generating a second sound and/or light source 114 emitting light in a second setting. The second sound may generate a continuous beep, siren, ring, bell, horn, and/or other sounds. The generated sound may be sufficiently loud to alert the user of the portable alarm, alert others in the surrounding area, and/or deter an intruder. Light source 114 may emit a bright, flashing red light when in the second light setting. In some implementations, the second feedback may be generated and/or emit until the user deactivates portable alarm 100. By way of non-limiting illustration, deactivation of portable alarm 100 may be responsive to a first selection combination of button 108 (shown in FIGS. 1A-B and 4A).

Figure 5A:
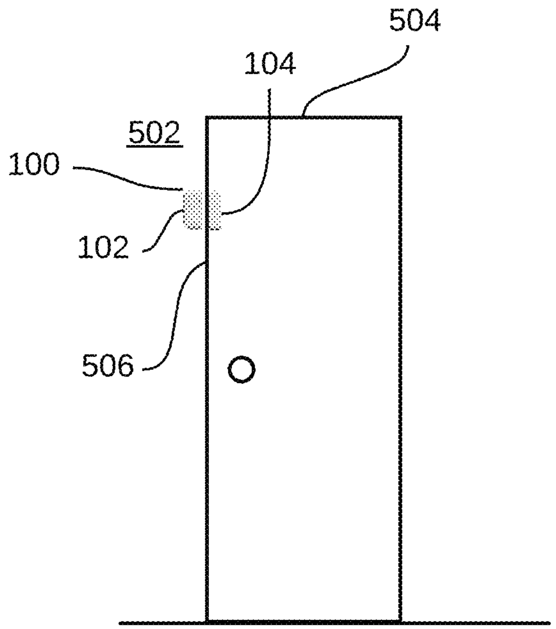
FIGS. 5A-B illustrate an exemplary implementation of the portable alarm, in accordance with one or more implementations.
Figure 5B:
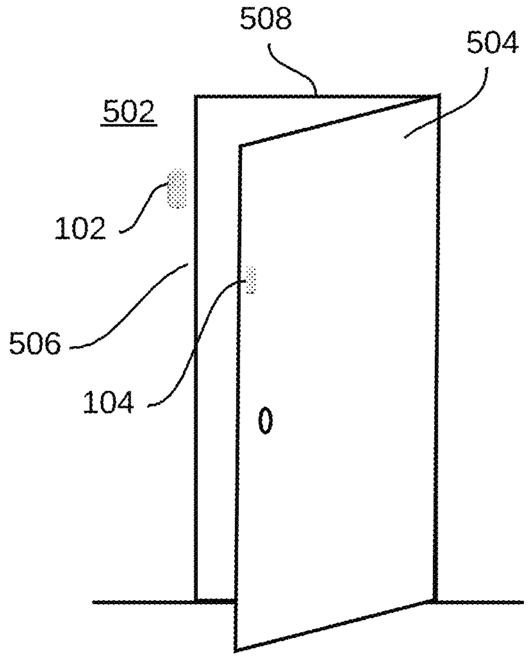

FIGS. 5A-B illustrate an exemplary implementation of portable alarm 100. Referring to FIG. 5A, detector body 102 may be releasably mounted to a wall 502. While detector body 102 is shown as being directly mounted to wall 502, this is not intended to be limiting. In some implementations, detector body 102 and/or detection body 104 may be releasably mounted to a portion of wall 502 forming aperture 508 (shown in FIG. 5B). A portion of wall 502 may include surfaces and/or items attached to wall 502. Items attached to wall 502 may include a frame, moulding, sill, strike plate, and/or surfaces and/or items attached to wall 502. Detection body 104 may be releasably mounted to closure 504 at or near a monitored boundary 506. In some implementations, detection body 104 may be releasably mounted to closure 504 at or near mounted detector body 102 and monitored boundary 506 (as shown in FIG. 5A). While FIG. 5A shows detector body 102 mounted to wall 502 and detection body 104 mounted to closure 504, this is not intended to be limiting. By way of non-limiting illustration, detector body 102 may be releasably mounted to closure 504 and detection body 104 may be mounted to wall 502 (or a portion of and/or items attached to wall 502). In some implementations, monitored boundary 506 may be between two closures (e.g., double doors). Detector body 102 may be mounted to a first closure and detection body 104 may be mounted to a second closure.

FIG. 5A illustrates closure 504 in a closed positioned relative to wall 502 forming aperature 508 (shown in FIG. 5B). In some implementations, responsive to closure 504 being in the closed positioned relative to wall 502 and portable alarm 100 being installed along monitored boundary 506, control circuitry 116 may be configured to control transducer 112 and/or light source 114 to generate the first feedback. The first feedback may be generated responsive to the proximity between detector body 102 and detection body 104 (and/or first sensor 120*a* and second sensor 120*b*, shown in FIG. 1A). In some implementations, responsive to closure 504 being in a closed position relative to wall 502, the surface of closure 504 and/or wall 502 may be offset. By way of non-limiting illustration, wall 502 may include a frame or moulding that extends from the surface of the wall and creates a step or lip along monitored boundary 106. One or more risers may be affixed to the surface of wall 502 and/or closure 504. The one or more risers may have a depth that is the same as or similar to the depth of the step or lip along monitored boundary 106. In some implementations, one or more of detector body 102 and detection body 104 may be mounted to the risers (via detector body mount 122 and detection body mount 124) to elevate the detector body 102 and detection body 104 such that detector body 102 and detection body 104 are mounted to wall 502 and/or closure 504 in alignment on the same plane.

FIG. 5B illustrates closure 504 in an opened positioned relative to wall 502 forming aperture 508. Subsequent to the provision of the first feedback and responsive to a reduction in proximity between detector body 102 and detection body 104 (and/or first sensor 120*a* and second sensor 120*b*, shown in FIG. 1A) caused by the opening of closure 504, control electronics 116 may control transducer 112 and/or light source 114 to generate the second feedback. The second feedback may alert the user to the opening of aperature 508 caused by the relative movement of closure 504 and/or to deter an intruder. While FIGS. 5A-B illustrate portable alarm 100 installed with a hinged door, this is not intended to be limiting. Portable alarm 100 may be installed with other apertures that be opened and closed. For example, portable alarm 100 may be installed with sliding doors and windows, doors and windows that move relative to each other (e.g., French doors), and/or other types of apertures.

Figure 6:
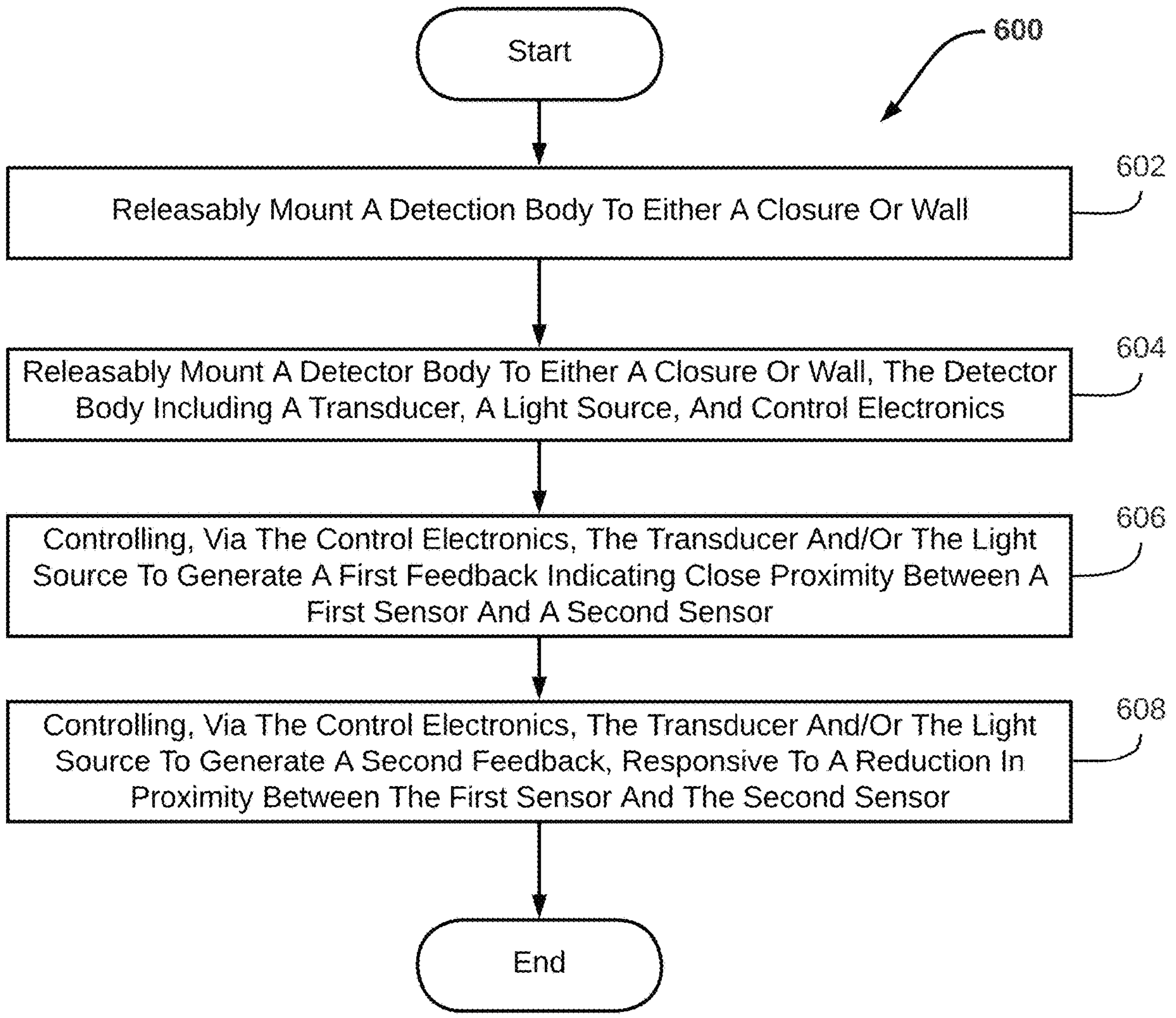
FIG. 6 illustrates a method for providing the portable alarm, in accordance with one or more implementations.

FIG. 6 illustrates a method 600 to provide a portable alarm for detecting relative movement between a closure of an aperture and a wall forming the aperture, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

An operation 602 may include releasably mounting a detection body to either the closure or the wall via a detection body mount. The detection body, and components thereof, may be described as detection body 104 in FIGS. 1A-B, 2, 3A-B, and 4A-B.

An operation 604 may include releasably mounting a detector body having a front side and a back side opposite from the front side via a detector body mount at the back side of the detector body, the detector body including a first sensor carried by the detector body, a transducer, a light source, and control electronics. The detector body, and components thereof, may be described as detector body 102 in FIGS. 1A-B, 2, 3A-B, and 4A-B.

An operation 606 may include controlling, via the control electronics, the transducer and/or the light source to generate a first feedback. The first feedback may indicate close proximity between the first sensor and a second sensor carried by the detection body.

An operation 608 may include controlling the transducer and/or the light source to generate a second feedback different from the first feedback, subsequent to provision of the first feedback, and/or responsive to a reduction in proximity between the first sensor and the second sensor such that, and/or responsive to the detector body and the detection body being mounted in proximity to each other on opposite sides of the monitored boundary, generation of the second feedback is indicative of relative movement of the closure to open the aperture.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A portable alarm configured to detect relative movement between a closure of an aperture and a wall forming the aperture, wherein the aperture and the wall form a monitored boundary such that relative movement between the closure of the aperture and the wall at the monitored boundary operate to facilitate opening and closing of the aperture, the portable alarm comprising:

a detection body including a detection body mount configured to releasably mount the detection body to either the closure or the wall;

a detector body, the detector body having a front side and a back side opposite the front side, the detector body including:

a detector body mount at the back side of the detector body configured to releasably mount the back side of the detector body to either the closure or the wall;

a first sensor carried by the detector body, the first sensor being configured to generate a sensor signal indicating relative movement between the detector body and the detection body;

a transducer configured to controllably generate sound;

a light source configured to controllably emit light;

control electronics coupled with the first sensor, the control electronics being configured to control the transducer and/or the light source to generate a first feedback indicating close proximity between the first sensor and a second sensor carried by the detection body, and to control the transducer and/or the light source to generate a second feedback different from the first feedback, subsequent to provision of the first feedback, responsive to a reduction in proximity between the first sensor and the second sensor such that, responsive to the detector body and the detection body being mounted in proximity to each other on opposite sides of the monitored boundary, generation of the second feedback is indicative of relative movement of the closure to open the aperture.

2. The portable alarm of claim 1, wherein the detector body mount and the detection body mount are replaceable adhesives, magnets, and/or suction cups.

3. The portable alarm of claim 1, wherein the sensor signal generated by the first sensor is an electromagnetic signal, an electrical signal, an ultrasonic sound signal, or a light signal.

4. The portable alarm of claim 1, wherein the second sensor is configured to reflect the sensor signal generated by the first sensor such that the control electronics are configured to control the transducer and/or the light source to generate the first feedback, responsive to detection, by the first sensor, of the reflected sensor signal indicating close proximity between the first sensor and the second sensor.

5. The portable alarm of claim 4, wherein the control electronics control the transducer and/or the light source to generate the second feedback different from the first feedback, responsive to a reduction in proximity between the first sensor and the second sensor such that the reflected sensor signal is not detectable by the first sensor indicating relative movement of the closure to open the aperture.

6. The portable alarm of claim 1, wherein the first feedback indicates to a user the portable alarm is engaged to detect relative movement of the closure to open the aperture.

7. The portable alarm of claim 1, wherein the detector body includes a power switch that enables and disables the control electronics.

8. The portable alarm of claim 1, wherein the detector body includes a button, wherein a first selection upon the button activates the transducer to generate a first sound, and wherein a second selection upon the button deactivates the transducer.

9. The portable alarm of claim 1, wherein the detector body includes one or more openings configured to facilitate escape of sound generated by the transducer and/or light emitted by the light source.

10. The portable alarm of claim 1, wherein the light source is configured to controllably emit light having different light features, the light features include color, a presentation pattern, and brightness, wherein the presentation pattern is one of a continuous light presentation, a flashing light presentation, and a perimeter movement presentation.

11. A method for providing a portable alarm for detecting relative movement between a closure of an aperture and a wall forming the aperture, wherein the aperture and the wall form a monitored boundary such that relative movement between the closure of the aperture and the wall at the monitored boundary operate to facilitate opening and closing of the aperture, the method comprising:

releasably mounting a detection body to either the closure or the wall via a detection body mount;

releasably mounting a detector body having a front side and a back side opposite from the front side via a detector body mount at the back side of the detector body, the detector body including:

a first sensor carried by the detector body, the first sensor being configured to generate a sensor signal indicating relative movement between the detector body and the detection body;

a transducer configured to controllably generate sound;

a light source configured to controllably emit light;

control electronics coupled with the first sensor;

controlling, via the control electronics, the transducer and/or the light source to generate a first feedback indicating close proximity between the first sensor and a second sensor carried by the detection body; and controlling, via the control electronics, the transducer and/or the light source to generate a second feedback different from the first feedback, subsequent to provision of the first feedback, responsive to a reduction in proximity between the first sensor and the second sensor such that, responsive to the detector body and the detection body being mounted in proximity to each other on opposite sides of the monitored boundary, generation of the second feedback is indicative of relative movement of the closure to open the aperture.

12. The method of claim 11, wherein the detector body mount and the detection body mount are replaceable adhesives, magnets, and/or suction cups.

13. The method of claim 11, wherein the sensor signal generated by the first sensor is an electromagnetic signal, an electrical signal, an ultrasonic sound signal, or a light signal.

14. The method of claim 11, wherein the second sensor is configured to reflect the sensor signal generated by the first sensor, and wherein the first sensor is configured to detect the reflect sensor signal.

15. The method of claim 14, wherein the method further includes:

controlling, via the control electronics, the transducer and/or the light source to generate the first feedback, responsive to detection, by the first sensor, of the reflected sensor signal by the second sensor indicating close proximity between the first sensor and the second sensor; and controlling, via the control electronics, the transducer and/or the light source to generate the second feedback different from the first feedback, responsive to a reduction in proximity between the first sensor and the second sensor such that the reflected sensor signal is not detectable by the first sensor indicating relative movement of the closure to open the aperture.

16. The method of claim 11, wherein the first feedback indicates to a user the portable alarm is engaged to detect relative movement of the closure to open the aperture.

17. The method of claim 11, wherein the detector body includes a power switch that enables and disables the control electronics.

18. The method of claim 11, wherein the detector body includes a button, wherein a first selection upon the button activates the transducer to generate a first sound, and wherein a second selection upon the button deactivates the transducer.

19. The portable alarm of claim 11, wherein the detector body includes one or more openings configured to facilitate escape of sound generated by the transducer and/or light emitted by the light source.

20. The method of claim 11, wherein the light source is configured to controllably emit light having different light features, the light features include color, a presentation pattern, and brightness, wherein the presentation pattern is one of a continuous light presentation, a flashing light presentation, and a perimeter movement presentation.

* * * * *